Aug. 4, 1942.    G. L. SMITH    2,292,018

BRAKE ADJUSTER

Filed April 10, 1941

GEORGE L. SMITH,
INVENTOR.

BY *Blair Killough*
ATTORNEYS.

Patented Aug. 4, 1942

2,292,018

UNITED STATES PATENT OFFICE 2,292,018

BRAKE ADJUSTER

George L. Smith, Washington, D. C., assignor to Thermo Brakes Corporation, Washington, D. C., a corporation of Virginia Application April 10, 1941, Serial No. 387,927

8 Claims. (Cl. 188—79.5)

My invention relates to adjusting mechanism for brakes and more specifically to thermostatic control of such mechanisms for internal expanding brakes.

In my Patent #2,060,429 of Nov. 10, 1936, I show such a mechanism as applied to a brake which reacts from a fixed anchor pin. Another type of brake now in use dispenses with this anchor pin and utilizes the hydraulic cylinder as a brake anchor and it is the object of this invention to show how my thermostatically controlled mechanism may be applied to this later type of brake where there is no fixed centre of adjusting movement of the shoes to which the linkage may be attached.

Another object of my invention is to show how a ratchet lever for operating the ratchet wheel which turns a right and left threaded adjusting screw must be mounted in order that the angular displacement of the shoe resulting from adjustment of the brake will not alter or vary the action of this ratchet lever. If care is not exercised to do this the adjusting action would change as the brake lining wore down, and interfere with the proper contact of the ratchet lever on the teeth of the ratchet wheel.

Another object is to so design the parts that it will not be necessary to use any rights and lefts.

The new type of brake shown in this application is used largely on airplanes and the brake drums are made as light as possible to avoid too much weight. This results in considerable distortion of the drum when the brakes are applied hard, changing them from true circular form to an elliptical shape, and it is therefore another object of my invention to design my take-up mechanism so that this distortion will not interfere with the uniformity of its action.

Still another object is to so design the mechanism that the running clearance of the brake will depend almost entirely upon the length of the piston stroke and will not be subject to change by drum distortion or by any mechanic servicing the brakes.

Other objects will be in part obvious from the annexed drawing, and in part as hereinafter indicated in connection therewith by the following analysis of this invention.

This invention accordingly consists in the features of construction combination of parts and in the unique relation of the members and the relative proportioning and disposition thereof, all as more completely outlined herein.

To enable others skilled in the art fully to comprehend the underlying features of this invention, that they may embody the same by the modifications in structure and relation contemplated thereby, a drawing depicting a preferred form of the invention has been annexed as part of this disclosure, and in such drawing like characters of reference denote corresponding parts throughout all of the views, in which:—

Figure 1:
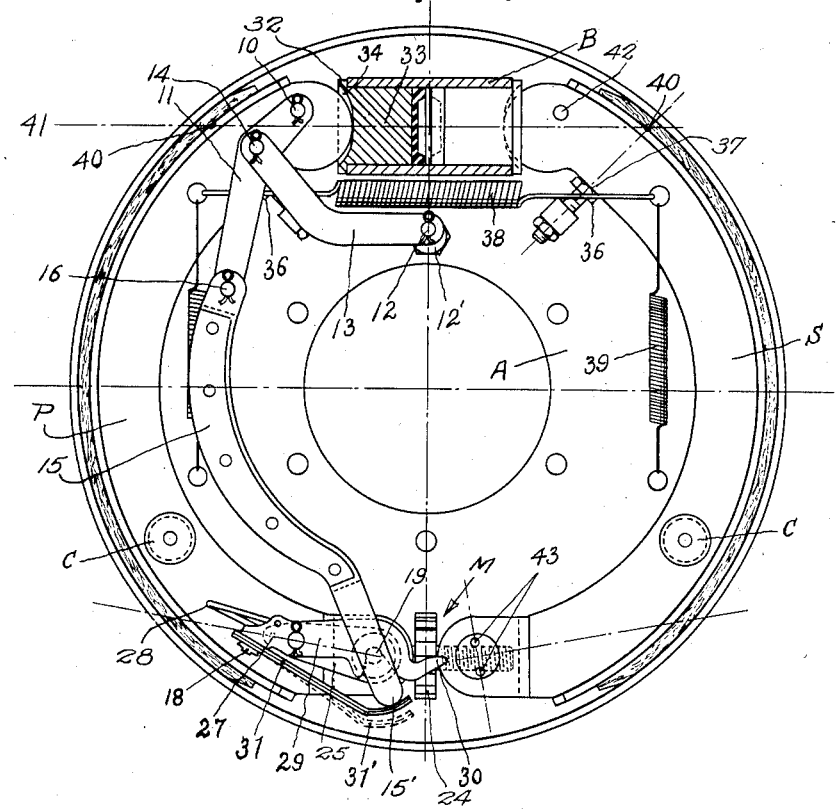
Fig. 1 is a side elevation of a brake with drum head removed.
Figure 2:
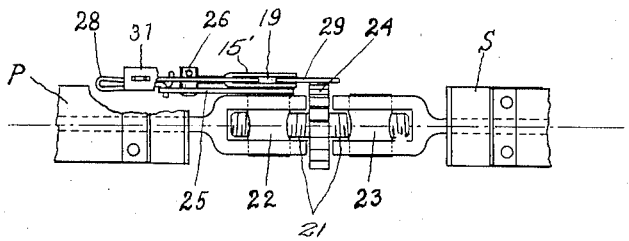
Fig. 2 is a view of the adjusting screw and its adjacent parts.

Referring to the drawing, A represents the brake support plate having an hydraulic cylinder B attached thereto and two steady rests CC, one for each shoe. P represents the primary shoe and S the secondary shoe with an adjusting screw mechanism M inter-connecting their lower ends, and it is the object of my invention to attach the necessary parts to cause this screw, which must now be turned by hand, to be turned automatically whenever the running clearance becomes too great.

A pivot pin 10 is secured to the anchor end of the shoe P and carries a short toggle arm 11. A pivot pin 12 is provided on the bolt 12', one of 6 bolts, which secures the support plate to the axle, not shown. A link 13 is connected to this pivot and the other end of it is pivotally connected to the toggle arm 11 by the pivot pin 14.

A long toggle arm 15 is connected to the short toggle arm 11 by the pivot pin 16 and is provided with a bearing 19 riveted between the two halves which make up this arm.

The adjusting screw mechanism M is composed of a right and left hand screw 21 engaging pivot nuts 22 and 23, mounted in the jaws of the two brake shoes. I secure to this screw a ratchet wheel 24 positioned between the ends of the shoes and having teeth for turning the screw to separate these ends and expand the shoes into their drum. On the pivot nut 22 which is in line with the bearing 19 I secure a plate 25 which carries the pivot stud 26 while its small end extends beyond the stud 26 and has a hole 27 to receive a spring 28.

To the stud 26 I pivot a ratchet lever 29 which has a slot at its lower side which receives the bearing 19. The end of lever 29 is formed into a pawl 30 for engaging the teeth of ratchet wheel 24. To the lever 29 I rivet as at 18, a bi-metal spring 31 with its high expansion side next to the lever so that heating of this spring will cause its free end to bend away from the lower end of toggle arm 15, as shown by the dotted lines 31'.

Thus the connection between link 15 and lever 29 permits the link to raise the lever by contact of the bearing 19 with the upper side of the slot provided in the lever, while downward movement of lever 29 is effected by pressure of the end of link 15 against the bi-metal spring 31. Thus the downward movement of pawl 30 is controlled by the bi-metal spring which tends to shorten this movement as it heats up. The arm 15 is made of two strips of metal riveted together and separated at their lower ends, at 15', to pass on either side of lever 29 and are held in fixed spaced relation by the bearing 19 riveted to them. The ratchet lever spring 28 is connected to the plate 25 and lever 29 and this spring is formed to exert a rotative force on the lever to swing it up against the engaged tooth of the ratchet wheel 24 as well as to rock the pawl 30 towards the ratchet wheel so that it would pick up the next lower tooth should the pawl swing down sufficiently far to allow this action.

To properly describe the action of my adjuster it is necessary to explain the action of the brake shoes under various conditions of service. The anchorage is effected by providing a shoulder 32 on the piston 33 which bears against the end of the cylinder B. The end of the piston has a groove 34 receiving the end of the shoe P and holding it in proper position while at the same time permitting a slight vertical sliding movement of the shoe in the groove 34.

Adjusting screws 36 for regulating the running clearance of the shoes at their anchor ends are carried by support plate A and bear against 45° slopes 37 on the shoe webs. When the brake is released, the brake release spring 38 holds the shoe ends against the pistons 33 and the shoulders 32 bear against the ends of the cylinder B, while the springs 39 hold the shoes down against the screws 36. When the lower end of the shoe P is rotated to the left by the action of the adjusting screw mechanism a slight sliding movement of the shoe in the grooves 34 and of the slope 37 on the screws 36 takes place and the shoe pivots about a point 40 which is the intersection of the line 41 and the axis of the adjusting screw 36.

This pivotal movement is with respect to the brake support plate A, and results from the sliding movement of two points on the shoe held against two fixed surfaces set at an angle of 45° with each other. To fulfill such a condition a pivotal movement is required and, were the point 40 equidistant from the fixed surfaces, a pivotal movement only would result for small increments of sliding movement. As this is not the case this point 40 shifts slightly as adjustment takes place but this amount is very small so that point 40 can be called the centre of movement of the shoe resulting from the adjustment of mechanism M. I therefore locate the line of pivots 12—14 so that it passes through point 40 and thus the adjusting rotation of the shoe does not disturb the toggle formed by links 11 and 15.

As the shoe swings about this centre 40 when adjusting action takes place the screw 21 rotates the pivot nut 22 slightly in the jaw of shoe P but this angular movement has no effect upon the ratchet mechanism as the bearing 19 is in line with the centre of nut 22 and the curved end of the bi-metal spring 31 forms an arc whose centre is also the centre of nut 22.

Now in braking, the secondary shoe S remains against the anchor and the primary shoe P is moved to the left towards the drum by the movement of the piston 33. Pivot 12 is fixed with respect to the brake shoe and pivot 10 moves with the shoe thus rotating the toggle arm 11 to straighten out the toggle and move the lower end 15' of 15 down against the bi-metal spring 31. The normal pressure of this spring against the end of link 15 is such that the ratchet lever 29 will then be moved downward and the pawl 30 will travel toward the next tooth on wheel 24. When this movement becomes sufficiently great, this next tooth is engaged and the pawl 30 is raised by upward movement of 19 acting against the open ended slot in 29 and turns the ratchet wheel as the shoe P goes back to its off position when the brake is released.

Now in easy braking, the pivot 10 moves to the left until the shoe contacts the drum and then moves down slightly as the shoe rotates with the drum to take up all the slack. But in heavy braking the drum becomes elliptical with its long axis extending through the upper portion of the secondary shoe where the braking pressure is a maximum. This causes the drum adjacent the pivot 10 to move in towards its centre with the result that there is more downward movement of pivot 10, but this downward movement produces a sliding movement of the shoe end in the groove 34 and does not affect the piston stroke. It does affect the toggle action, but to a small degree which may be disregarded, so that the toggle movement is controlled substantially by the length of the piston stroke and by no other factor.

In operation, the toggle mechanism acts to swing the ratchet lever 29 downward each time the brake is applied, but if the brake parts become hot as a result of heavy braking pressure, the bi-metal spring 31 will bend away from the end 15' of link 15 as shown by dotted lines 31' so that the toggle must take up this slack before it can rotate the lever 29 downward, thus delaying its action in picking up a new tooth on wheel 24. In this way the action of the adjuster is temporarily interrupted until the brake cools off and the drum returns to its normal size, at which time a new tooth would be picked up by the pawl 30 provided the wear of the lining warranted it.

To avoid the use of rights and lefts in my mechanism, I provide a hole 42 in the shoe S and two screw holes 43 in the pivot nut 23 similar to the ones provided in pivot nut 22 for securing the plate 25 to it. This permits this plate to be secured to the nut 23 so that the parts 10, 11, 13, 15 and 29 can be reversed to the opposite hand and mounted on shoe S.

To ensure the toe 30 being positioned when brake is unapplied, on the centre line of the screw 21 I locate the pivot 12 eccentric to the centre of bolt 12'. The turning of this bolt would then vary the position of pivot 12 and produce a slight movement of the toggle 11—15 to raise or lower the pawl 30 to its proper position in line with the axis of screw 21. This adjustment should be made after screws 36 are properly set and after once made, these adjustments would never need to be changed.

While this invention has been described in connection with a conventional type of brake, the principles involved are susceptible of various modifications which would be apparent to anyone skilled in the art. The invention is, therefore, to be limited only as indicated by the scope of the appended claims.

I claim:
1. In a two shoe internal expanding brake having bearings provided in adjacent ends of said shoes, members mounted in said bearings and a right and left handed adjusting screw engaging screw threaded holes in said members, the combination of a ratchet wheel carried by said screw, a bracket mounted on one of said members and carrying a pivot, a ratchet lever mounted on said pivot and engaging said ratchet wheel and a toggle mounted on one of said shoes and connected to said ratchet lever by a bearing whose centre coincides substantially with the centre of the member carrying said bracket.

2. In a two shoe internal expanding brake, a thermostatically controlled automatic brake adjusting mechanism for said shoes producing rotary adjusting movement of said shoes about two substantially fixed centres, a toggle mounted on one of said shoes and connected to said mechanism to operate it and a link connected to said toggle to operate it having its line of effort passing substantially through the centre of adjusting movement of the shoe upon which the toggle is mounted.

3. A two shoe internal expanding fluid operated brake comprising a fluid pressure cylinder serving as an anchor for said shoes, a piston in said cylinder for applying said brake and a thermostatically controlled adjusting mechanism connecting said shoes and set for operation by brake applying movement of said piston beyond a pre-determined point.

4. In a two shoe hydraulically operated internal expanding brake, the combination of an hydraulic cylinder serving as a brake anchor, a piston in said cylinder movable under hydraulic pressure to apply the brake, a toggle mechanism mounted on one shoe and extended by brake applying movement produced by said piston, an adjusting screw connecting adjacent ends of said shoes having a ratchet wheel, a ratchet lever to operate said wheel associated with the operating end of said toggle and a bi-metal spring mounted on said ratchet lever and bearing against the end of said toggle when said brake is cool whereby movement of said ratchet lever in one direction to engage a new tooth on said ratchet wheel is effected by movement of said toggle end against said spring.

5. In a two shoe hydraulically operated internal expanding brake, the combination of an hydraulic cylinder serving as a brake anchor, a piston in said cylinder movable under hydraulic pressure to apply the brake, a toggle mechanism mounted on one shoe and extended by brake applying movement produced by said piston, an adjusting screw connecting adjacent ends of said shoes having a ratchet wheel, a ratchet lever to operate said wheel associated with the operating end of said toggle, and a bi-metal spring mounted on said ratchet lever and spaced from the end of said toggle when said brake is hot, whereby initial movement of said toggle end does not produce movement of said ratchet lever.

6. In a brake mechanism, an anchor, an adjustable friction element adapted to anchor thereon and having a pivotal adjusting movement about a substantially fixed point spaced from said anchor, a device forming an adjuster including thermostatic means, and a linkage connection between the adjuster device and the friction element whereby to operate the adjuster device to effect the aforesaid adjusting movement of said element on the occurrence of wear.

7. In a brake mechanism, a brake drum, an anchor, an adjustable brake shoe anchored thereon and carrying a frictional element engaging said drum, said shoe having an adjusting movement about a substantially fixed point adjacent said element, a device forming an adjuster including thermostatic means, and a linkage connection between the adjuster device and the brake shoe whereby to operate the adjuster device to effect the aforesaid adjusting movement of said shoe on the occurrence of wear.

8. In a brake mechanism, a brake drum, an anchor, an adjustable brake shoe anchored thereon and carrying a frictional element engaging said drum, said shoe having an adjusting movement about a substantially fixed point within said element, a device forming an adjuster including thermostatic means, and a linkage connection between the adjuster device and the brake shoe whereby to operate the adjuster device to effect the aforesaid adjusting movement of said shoe on the occurrence of wear.

GEORGE L. SMITH.